US007290442B2

(12) United States Patent
Zhu et al.

(10) Patent No.: US 7,290,442 B2
(45) Date of Patent: Nov. 6, 2007

(54) METHOD AND SYSTEM OF ESTIMATING MBT TIMING USING IN-CYLINDER IONIZATION SIGNAL

(75) Inventors: Guoming G. Zhu, Novi, MI (US); Chao F. Daniels, Ann Arbor, MI (US); Kevin D. Moran, Trenton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 46 days.

(21) Appl. No.: 10/926,110

(22) Filed: Aug. 25, 2004

(65) Prior Publication Data

US 2006/0042355 A1 Mar. 2, 2006

(51) Int. Cl.
*G01M 15/00* (2006.01)

(52) U.S. Cl. .................................... 73/117.3; 73/35.08

(58) Field of Classification Search ............... 73/35.01, 73/35.07, 35.08, 112, 116, 117.2, 117.3, 118.1
See application file for complete search history.

(56) References Cited

U.S. PATENT DOCUMENTS

| | | | | |
|---|---|---|---|---|
| 5,896,842 | A * | 4/1999 | Abusamra | 123/406.39 |
| 6,609,497 | B2 * | 8/2003 | Daniels | 123/406.43 |
| 2003/0121499 | A1 * | 7/2003 | Daniels | 123/406.43 |
| 2004/0084018 | A1 * | 5/2004 | Zhu et al. | 123/406.14 |
| 2004/0084020 | A1 * | 5/2004 | Daniels et al. | 123/406.23 |
| 2004/0084025 | A1 * | 5/2004 | Zhu et al. | 123/435 |
| 2004/0084026 | A1 * | 5/2004 | Zhu et al. | 123/435 |
| 2004/0084035 | A1 * | 5/2004 | Newton | 123/630 |
| 2004/0085070 | A1 * | 5/2004 | Daniels et al. | 324/391 |
| 2004/0088102 | A1 * | 5/2004 | Daniels et al. | 701/108 |

OTHER PUBLICATIONS

Guoming G. Zhu, Chao F. Daniels and James Winkelman, Visteon Corporation, MBT Timing Detection and Its Closed-Loop Control Using In-Cylinder Pressure Signal, 2003 Society of Automotive Engineers, Inc. (2003-01-3266).

Chao F. Daniels, Champion Ignition Products, The Comparison of Mass Fraction Burned Obtained from the Cylinder Pressure Signal and Spark Plug Ion Signal, 1998 Society of Automotive Engineers, Inc. (980140), pp. 16-23.

Gerald M. Rassweiler and Lloyd Withrow, Motion Pictures of Engine Flames Correlated with Pressure Cards, S.A.E. Journal Transactions, Society of Automotive Engineers, Inc., vol. 33, 1938, vol. 42, No. 5, pp. 186-204.

J. Cooper, Ford Engine Mapping 1999.75 MY 1.0 SOHC HCS BE 146/BE91 FAB Pre-Series) Comparison between Mapping MBT versus 50% Mass Fraction Burn MBT, Nov. 6, 1997, pp. 1-6.

(Continued)

*Primary Examiner*—Eric S. McCall
(74) *Attorney, Agent, or Firm*—Brinks Hofer Gilson & Lione

(57) ABSTRACT

A robust multi-criteria minimum timing for the best torque (MBT) timing estimation method and apparatus utilizes different ionization signal waveforms that are generated under different engine operating conditions. The MBT timing criteria is calculated based upon both ionization and analog derivative ionization. Multiple MBT timing criteria are determined and combined to increase the reliability and robustness of MBT timing estimation based upon spark plug ionization signal waveforms. In a preferred embodiment, a combination of the MBT timing estimation criteria comprises a maximum flame acceleration location, a 50% burn location, and a second peak location.

22 Claims, 4 Drawing Sheets

OTHER PUBLICATIONS

Mark C. Sellnau, Frederic A. Matekunas, Paul A. Battiston and Chen-Fang Chang, David R. Lancaster, SAE Technical Paper Series 2000-01-0932, Cylinder-Pressure-Based Engine Control Using Pressure-Ratio-Management and Low-Cost Non-Intrusive Cylinder Pressure Sensors, Reprinted from: Electronic Engine Controls 2000: Controls (SP-1500), pp. 1-20.

* cited by examiner

METHOD AND SYSTEM OF ESTIMATING MBT TIMING USING IN-CYLINDER IONIZATION SIGNAL

FIELD OF THE INVENTION

The present invention relates generally to internal combustion engine ignition systems and, in particular, to a method of estimating Maximum Brake Torque (MBT) timing for an engine using an in-cylinder ionization signal, and a system for providing the same.

BACKGROUND

Typically, a Maximum Brake Torque (MBT) timing of an internal combustion engine is determined by conducting a spark sweep of an engine. By industry standards, a spark angle at maximum torque is referred as the MBT. A typical calibration point needs a spark sweep or mapping to see if the engine is operated at a desirable MBT timing condition. Spark mapping usually requires a tremendous amount of effort and time to achieve a satisfactory calibration. In recent years, various MBT timing detection schemes have been proposed based upon in-cylinder pressure or spark plug ionization signal.

Environmental and fuel economy issues have recently driven trends towards improved the efficiency of combustion engines. Typical trends have sought use of feedback control directly from the combustion information instead of using indirect measurements. Common availability of computing power has revolutionized possibilities of sensor interpretation and closed loop feedback control. Recent control developments are usually based on new sensors or improved interpretations of available sensor signals. One example is ionization current sensing which is obtained by applying a bias voltage on the spark plug when it is not used for ignition. The sensed ionization current typically depends on the ions created, and on correspondingly relevant ion factors (such as their relative concentration and recombination), on pressure, and on temperature. The ionization signal is typically rich in combustion information, but may also be complex to analyze.

The ionization current is typically measured at a low-voltage side of the secondary winding of an ignition coil and may not require protection from high-voltage pulses in the ignition. Examples of ionization current measurement systems are already in use for analyses of individual cylinder knock control, cam phase sensing, pre-ignition detection, misfire detection, and combustion quality detection such as dilution and lean limit. In addition, detection techniques of spark plug fouling by using the ionization current have been dessiminated throughout the industry.

Prior techniques have used ionization current data in an engine cylinder immediately after ignition and compared the data against a reference data to provide a correction control when a result of the data comparison indicates a less than desirable internal combustion, i.e. low output power or degradation in the cylinder combustion. Conventional techniques have typically collected only discrete and/or periodical data, such as peak of signals, during an engine cylinder operation for inputs in corresponding feedback control schemes. It has been found that when the engine is operated at the corresponding MBT timing, a peak cylinder pressure usually occurs around 15° ATDC (After Top Dead Center), and the 50 percent Mass Fraction Burned (MBF) location generally occurs from 8° to 10° ATDC.

In view of the above-discussed problems, it is an object of this invention to provide a real-time estimation algorithm using an ionization signal to construct a composite MBT timing criterion, which is robust over an engine operational map. Accordingly, this invention discloses a real-time estimation algorithm, using both analog and digitally conditioned ionization signals, to construct a composite MBT timing criterion that is robust over an engine operational map.

One advantageous feature of this invention is the providing of a composite MBT timing criterion based upon the shape of ionization signal, instead of magnitude for improved estimation robustness.

Another advantageous feature of this invention is the providing of a mixed signal conditioning method, which includes both analog signal and digital signal conditioning, for improved estimation quality. The analog signal conditioning circuit may reduce both ionization signal sample rate and the microprocessor throughput of digital signal conditioning. In addition, the composite MBT timing criterion may utilize multiple MBT timing measures of the ionization signal to generate a true full range MBT timing criterion. As a result, a real-time estimation algorithm, using ionization signals, to construct a composite MBT timing criterion that is robust over engine operational map is realized.

BRIEF SUMMARY

In one aspect of the invention, a method of estimating MBT (maximum brake torque) timing of an internal combustion engine uses an in-cylinder ionization signal.

In another aspect of the invention, the method of estimating MBT timing further comprises the step of mixing an analog signal and a digital signal conditioning to improve the estimation of the MBT timing. The mixing of an analog and digital signal conditioning architecture allows achieving robust estimation with low cost (minimum microprocessor throughput due to reduced sampling rate).

In another aspect of the invention, the method of estimating MBT timing further comprises a real time estimation algorithm. The real time estimation algorithm involves closed loop MBT timing control.

In another aspect of the invention the method of estimating MBT timing further comprises generating an MBT timing criterion based upon the in-cylinder ionization signal for closed loop MBT timing control.

In another aspect of the invention, the method of estimating MBT timing further comprises the step of correlating an ionization signal to a cylinder pressure signal.

In another aspect of the invention, the method of estimating MBT timing further comprises combining one or more of the following criteria: a maximum flame acceleration point, a maximum heat release location and a second peak location.

In another aspect of the invention, the method of estimating MBT timing further comprises determining what case an ionization signal waveform fits; and calculating MBT timing.

Another aspect of the invention comprises an MBT estimator, including a controller, memory operably connected to the controller, software stored in memory, and an ionization detection unit operably connected to the controller.

In another aspect of the invention, the MBT memory comprises instructions to determine what case an ionization signal waveform fits, and instructions to calculate MBT timing.

Further aspects and advantages of the invention are described below in conjunction with the present embodiments, and will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art. While this description summarizes some aspects of the present embodiments, it should not be used to limit the claims.

BRIEF DESCRIPTION OF THE DRAWINGS

The invention, together with the advantages thereof, may be understood by reference to the following description in conjunction with the accompanying figures, which illustrate some embodiments of the invention.

DETAILED DESCRIPTION OF THE PREFERRED EMBODIMENTS

Figure 1:
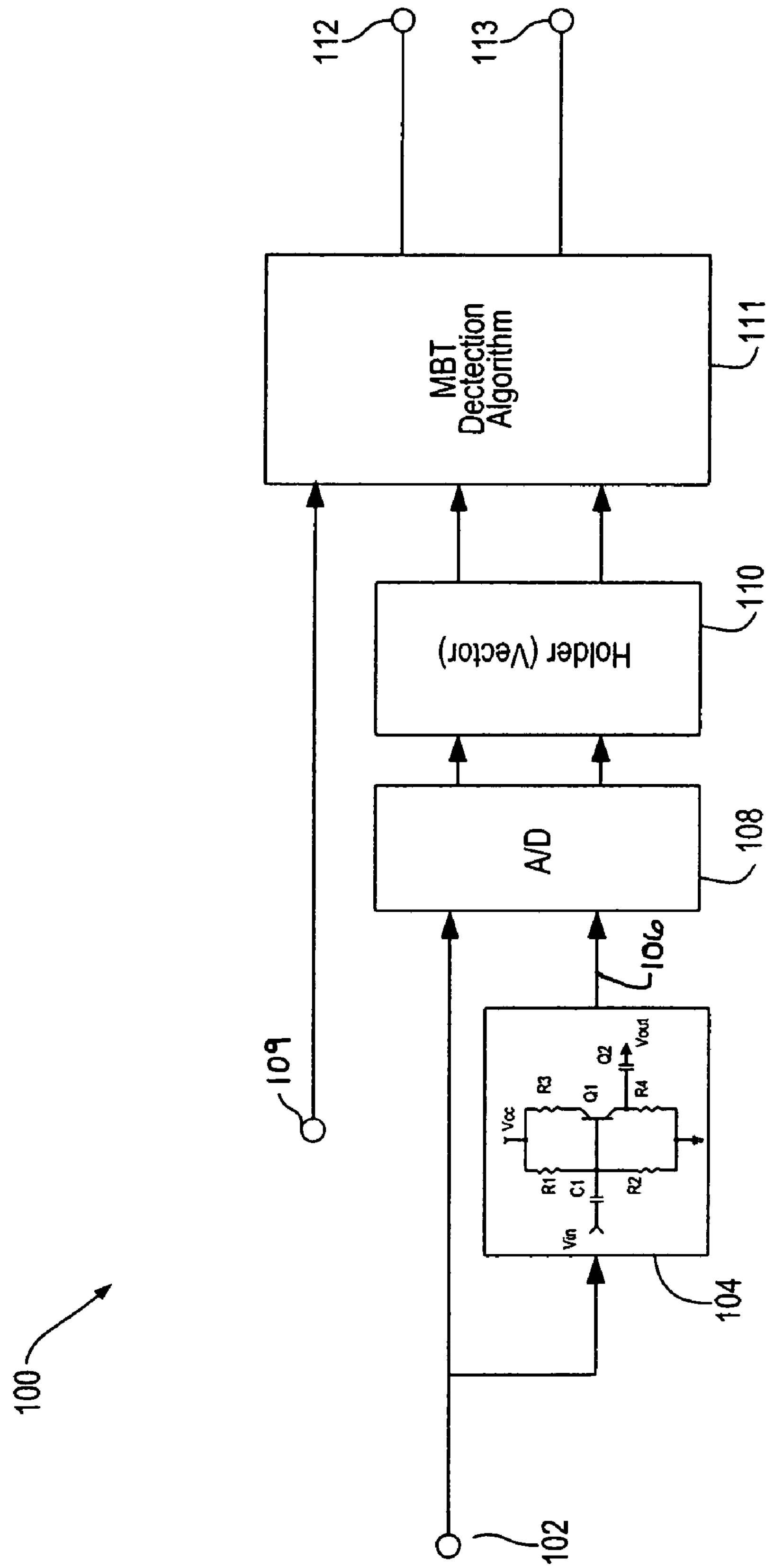
FIG. 1 is a block diagram of an embodiment of system architecture for estimating an MBT timing using an ionization signal.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to “the” object or “a” object is intended to denote also one of a possible plurality of such objects.

An ionization signal may be detected in an engine combustion chamber from an ionization detection circuit, by applying a bias voltage between a spark plug gap to monitor ignition and combustion parameters. The system and associated subsystems described herein use the ionization signal to diagnose engine performance. In a preferred embodiment, an ionization signal is used to determine the current engine crank cycle, i.e., Cylinder IDentification (CID), using a spark phase of the ionization signal.

Typically a goal of an internal combustion engine ignition system is to time the ignition (spark) so that the engine produces its maximum brake torque with a given air to fuel mixture. As stated earlier, this ignition/spark timing is also referred to as a Minimum timing for Best Torque or MBT timing. The mean brake torque of an internal combustion engine is a function of many factors such as air to fuel ratio, ignition/spark timing, intake air temperature, engine coolant temperature, etc. By fixing all the factors that affect the mean brake torque, the engine’s mean brake torque is a convex function of ignition/spark timing when the ignition/spark timing varies within a certain range, where MBT timing corresponds to the peak location of the convex function. If the ignition timing is either retarded or advanced relative to the MBT timing, the mean brake output torque is not maximized. Hence, running an internal combustion engine at its MBT timing provides improved and desirable fuel economy. Therefore, it is desirable to find criteria that can be used to produce a reliable estimate of MBT timing that can be used for closed loop control of engine ignition/spark timing. As such, a method to determine engine MBT timing at current operational conditions using an in-cylinder ionization signal will be described.

Turning now to the drawings, and particularly to FIG. 1, an embodiment of a system 100 for estimating MBT timing using an in-cylinder ionization signal is illustrated. The detected in-cylinder ionization signal 102 is initially transmitted to an analog/digital (A/D) converter 108, and to an analog conditioning circuit 104. The analog conditioning circuit 104 then outputs a conditioned ionization signal 106 to the A/D converter 108. Further, both the ionization signal 102 and the conditioned signal 106 are digitally sampled and stored in a vector buffer 110 before reaching an MBT detection system 111, which also monitors and uses engine operation parameters 110 in its MBT detection algorithm. The MBT detection algorithm system then produces an estimated MBT timing criterion 112 and an estimation status 113.

Mass fraction burned (MFB) is typically determined by the well-known Rassweiler-Withrow method. This Rassweiler-Withrow method is based on pressure measurement in a cylinder. This method uses a cylinder chamber volume at ignition time as a reference and calculates a net pressure increase at every crank angle for a complete combustion process, then normalizes the pressure by a maximum pressure increase at the end of combustion. The method ignores heat loss and mixture leakage during the combustion. Each percentage of pressure increase signifies a percentage of the mass fraction of fuel burned at the corresponding crank angle. In prior techniques, instead of directly using the mass fraction burned, a connection between MFB and net pressure is utilized to simplify analysis. The net pressure P and its first and second derivatives are used to represent the distance, velocity and acceleration of the combustion process. Prior related works have shown that the peak cylinder pressure location (PCPL), the 50% MBF location, and the maximum acceleration location of the net pressure can be used as MBT timing criteria for closed loop control. Next, a composite MBT timing criterion is introduced, developed and validated by a dynamometer test.

Figure 2:
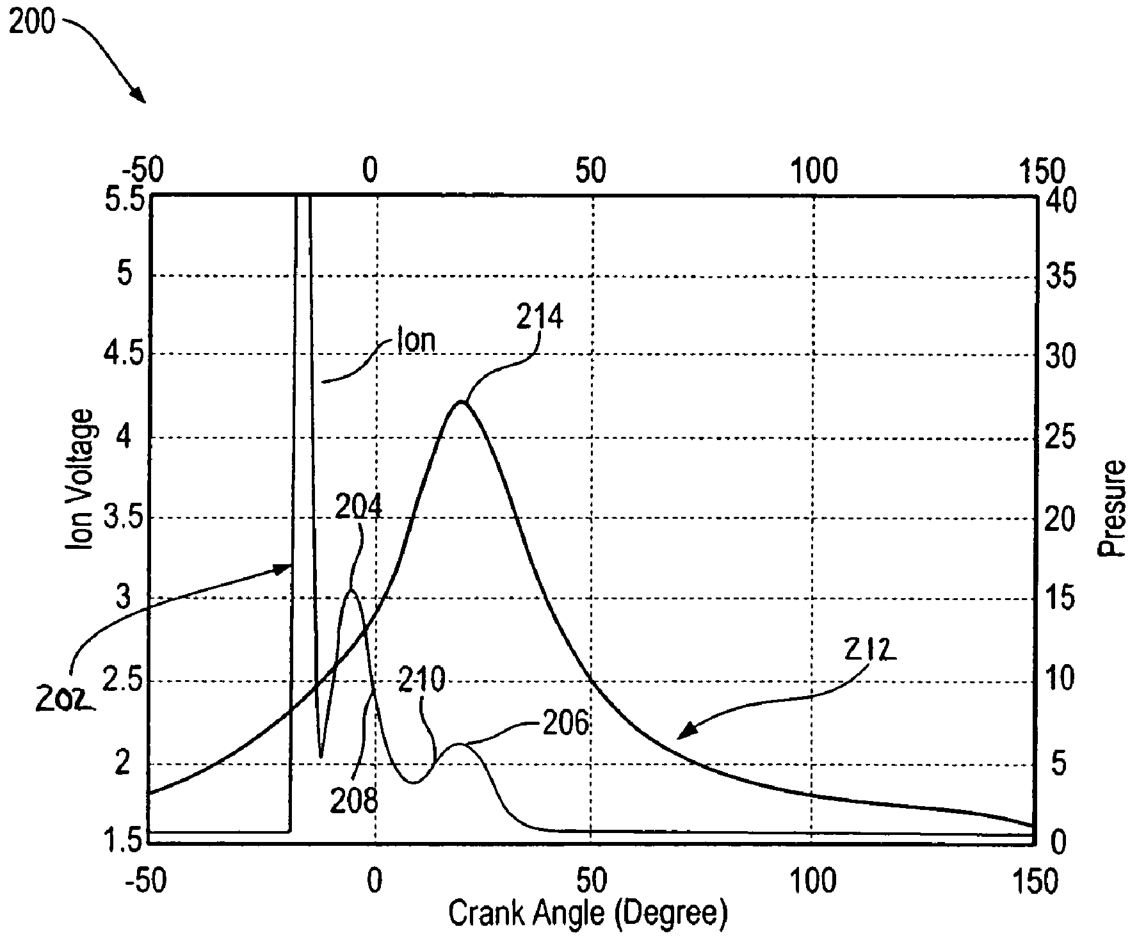
FIG. 2 is an illustrative graph of an ionization signal represented with a corresponding in-cylinder pressure graph.

Referring now to FIG. 2, the graph 200 illustrates an ionization signal versus crank angle trace or plot 202, where 0° (degree) is the top dead center (TDC), with a corresponding in-cylinder pressure signal trace 204. Contrary to a cylinder pressure signal that typically exhibits a relatively stable pressure curve throughout engine operating conditions, an ionization signal 202 typically shows more detailed information about the combustion process through a corresponding waveform. This waveform shape of the ionization signal can change with varying loads, speeds, spark timings, air to fuel A/F ratios, exhaust gas re-circulation (EGR) rates, etc. Searching for the ionization post flame peak that is supposed to be lined up with the peak pressure location is not always a reliable MBT timing criteria due to the disappearance of this peak at low loads, retarded spark timing, lean A/F ratios, or higher EGR rates. One can minimizes this above cited problems by establishing a robust multi-criteria MBT timing estimation method utilizing different ionization signal waveforms that may be generated under different engine operating conditions.

The ionization signal 102 is a measure of the local combustion mixture conductivity in the engine cylinder during the combustion process. This signal 202 is influenced not only by the complex chemical reactions that occur during combustion, but also by the local temperature and turbulence flow during the process. The ionization signal 102 is typically less stable than the cylinder pressure signal that is a measure of the global pressure changes in the cylinder.

The ionization signal trace 202 may show when a flame kernel is formed and propagates away from the spark gap, when the combustion is accelerating rapidly, when the combustion reaches its peak burning rate, and when the combustion ends. A typical ionization signal usually consists of two peaks. A first peak 204 of the ion signal represents the flame kernel growth and development, and a second peak 206 represents a re-ionization due to an in-cylinder temperature increase resulted from both pressure increase and flame development in the cylinder.

It has been recognized that the MBT timing occurs when the peak pressure location is around 15° After Top Dead Center (ATDC). By advancing or delaying the spark timing until the second peak of the ionization signal peaks around 15° ATDC, it is assumed that the MBT timing is found. The combustion process of an internal combustion engine is usually described using the mass fraction burn versus crank angle. Through mass fraction burn, one can find when the combustion reaches peak burning velocity and acceleration and percentage burn location as function of crank angle. Maintaining these critical events at a specific crank angle produces a desirably efficient combustion process. In other words, the MBT timing can be found through these critical events. Still referring to FIG. 2, an inflection point 208 located right after the first peak (called the first inflection point) can be correlated to a maximum acceleration point of the net pressure. This maximum acceleration point is usually between 10% to 15% mass fraction burned. Another inflection point 210, located to the right and before the second peak of the ionization signal (called the second inflection point) 206 may correlate well with a maximum heat release rate point and is located around 50% mass fraction burned location. In addition, the second peak location 206 is related to a peak pressure location 214 of the pressure signal graph 212.

At MBT timing, it is known that a Maximum Acceleration point of Mass Fraction Burned (MAMFB) is located at Top Dead Center TDC, that the 50 percent Mass Fraction Burned location (50% MFB) is around 8 to 10° ATDC, and that the peak cylinder pressure location (PCPL) around 15° ATDC. Using the MBT timing criteria relationship between in-cylinder pressure and in-cylinder ionization signal, these three MBT timing criteria, namely, MAMFB, 50% MFB, and PCPL, can be obtained using an in-cylinder ionization signal. Thus, combining all three individual MBT timing criterion or criteria into one produces increased reliability and robustness of the MBT timing prediction.

As stated above, the second peak 206 of the ionization signal 202 is typically due to the in-cylinder temperature rise during the combustion process. In the case that in-cylinder temperature does not reach a re-ionization temperature threshold, the second peak 206 of the ionization signal 202 may disappear. For example, when the engine is operated either at the idle condition, with very high EGR or with lean air to fuel (A/F) mixture or combination of the above, the flame temperature is relatively low and the temperature could be below the re-ionization temperature threshold. Therefore, the second peak 206 may not be found or shown in the ionization signal 202. As such, the second peak 206 of the ionization signal 202 does not always appear in the ionization signal waveform at all engine operating conditions. At light loads, lean mixtures, or high EGR rates, the second peak 206 can be difficult to identify. Under these circumstances, it is almost impossible to find the MBT timing using the $2^{nd}$ peak location 206 of the ionization signal 202. Therefore, the present invention uses multiple MBT timing criteria to increase the reliability and robustness of MBT timing estimation based upon in-cylinder ionization signal 202 waveforms. The present method therefore optimizes ignition timing by inferring from the ionization signal where the combustion event is placed in the cycle that corresponds to the MBT timing.

Figure 3A:
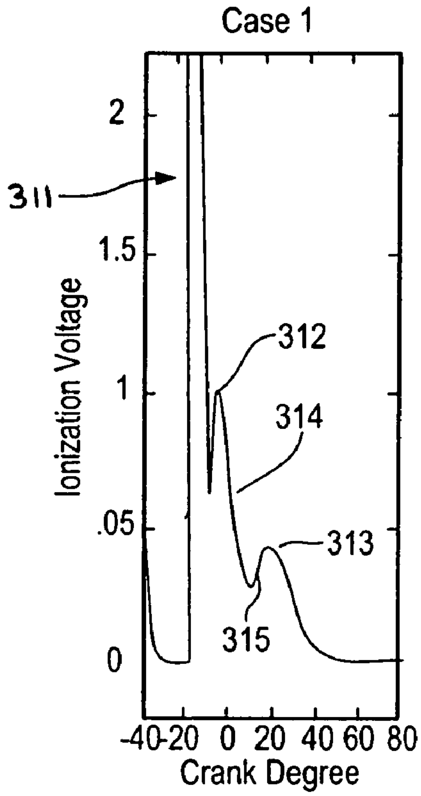
FIGS. 3*a*–3*c* are graphs illustrating three operational case waveforms that the ionization signal may take at various engine operating conditions.
Figure 3B:
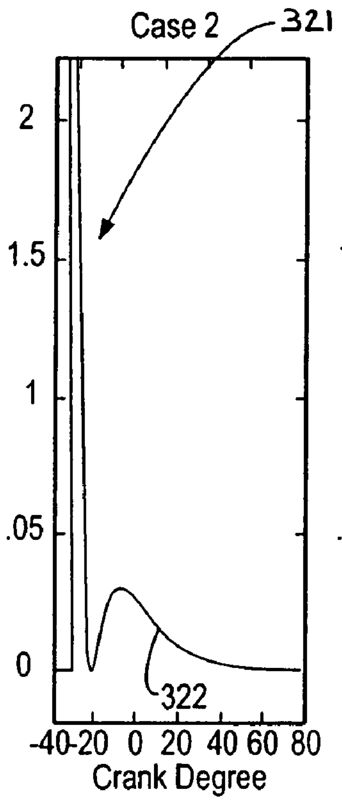
Figure 3C:
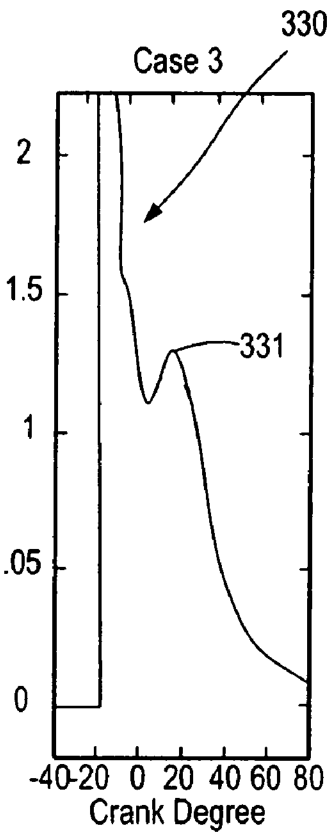

Now referring to FIGS. 3*a*–3*c*, the three graphs illustrate three operational case waveforms that the ionization signal 102 may take at various engine operating conditions. At various engine operational conditions, in-cylinder ionization signal waveform 202 can be divided into the following three cases, namely case 1 to case 3. Case 1 may represent the engine operating at 1500 rpm with a 2.62 bar BMEP load and without EGR (i.e. EGR=0%). Case 2 may represent the engine operating at 1500 rpm with a 2.62 bar BMEP load and with an EGR of 15%. Case 3 may represent the engine operating at 3500 rpm, with wide open throttle (WOT).

In regard to Case 1 and referring to FIG. 3*a*, a normal ionization waveform 311 is shown, where both peaks 312 and 313 are present in the waveform. In regard to Case 2 and referring to FIG. 3*b*, another ionization waveform 321 is shown, where the corresponding second peak does not show up due to the relatively low combustion temperature resulting from the high EGR, a lean mixture or a low load condition, or from a combination of these factors. In regard to Case 3 and referring to FIG. 3*c*, another ionization waveform 330 is shown, where the first peak 332 merges with the ignition signal due to the longer crank angle ignition duration resulting from a relatively constant spark duration at high engine speed.

Other relevant points on the ionization waveforms 311, 321, and 331 include the maximum flame acceleration location (close to or correlated to Top Dead Center (TDC) at MBT timing) 314 and 322, the maximum heat release location 315 that correlates to 50% burn location and close to 8–10% After Top Dead Center (ATDC) at MBT timing, and the second peak location 313 that correlates to peak cylinder pressure location and close to 15–17° After Top Dead Center (ATDC) at MBT timing.

Thus, one can see from FIGS. 3*a*–3*c* that three MBT timing criteria, namely MAMFB, 50% MFB, and PCPL, are available only in Case 1, and for Cases 2 and 3, only one or two criteria are available. This may indicate that at some operating conditions, only one or two MBT timing criteria can be obtained for estimating MBT timing. The proposed MBT timing estimation method is to combine all MBT timing criteria available at current operational condition into a composite criterion for improved reliability and robustness of MBT timing estimation. In a preferred embodiment, the MBT timing estimation criterion may be a combination of the maximum flame acceleration location, the 50% burn location 165, and the second peak location which are shown in Cases 1 through 3 of FIGS. 3*a*–3*c*. A detailed system architecture and algorithmic method to implement the MBT estimation will be described.

In order to implement the MBT timing estimation method using an in-cylinder ionization signal, a system architecture with mixed analog and digital signal processing as proposed in FIG. 1 is used. Recall that in order to detect 10% or 50% MFB location using ionization waveform, the first and second inflection points, shown in FIG. 3*a*, need to be calculated. Typically, this calculation may involve digital difference computations after the ionization signal is sampled through A/D converter 108, which is not recommended as a high digital sample rate is required that involves high throughput of Power train Control Module (PCM). Typically, the ionization signal is sampled at one crank degree resolution. Further, a difference calculation in a digital domain typically leads relatively large numerical error in comparison to a derivative calculation performed in a continuous domain. Thus, an analog circuit is proposed to complete the continuous derivative calculation before the signal is digitized at the A/D converter 108, as shown in FIG. 1.

Figure 4:
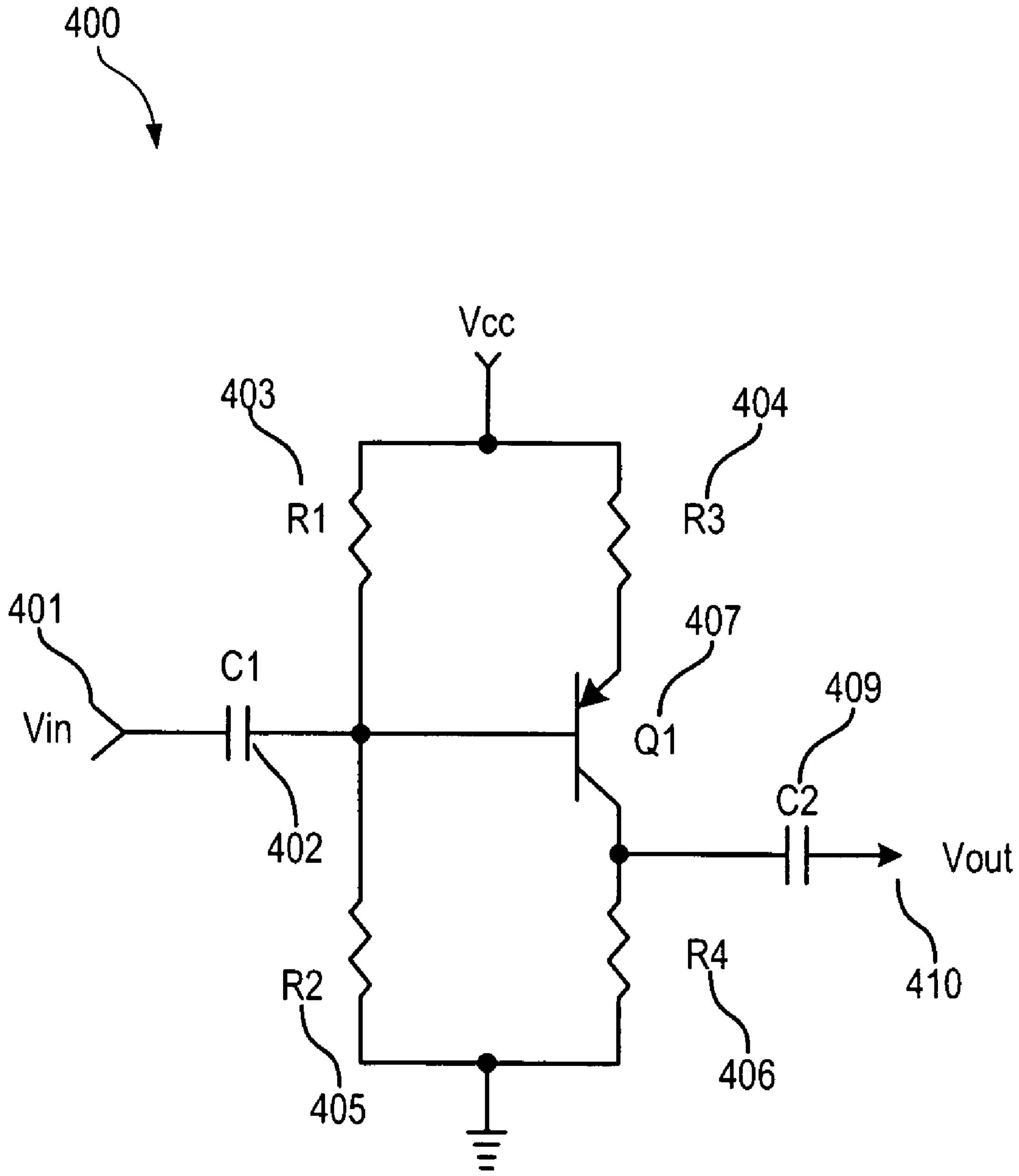
FIG. 4 is a diagram illustrating an analog derivative circuit in accordance with the present invention.

Now referring to FIG. 4, an embodiment of analog derivative circuit 400 is illustrated. The analog circuit 400, proposed to perform the continuous derivative between input $V_{in}$ 401 and output $V_{out}$ 410, comprises one transistor $Q_1$ 407, four resistors $R_1$ to $R_4$, 403 to 406 respectively, and two capacitors $C_1$ and $C_3$ 402 and 409. Now, assuming that the transistor 407 provides a substantially large current amplification coefficient β, then a transfer function G(s) of the analog circuit 400 may be defined as follows:

$$G(s) = \frac{V_{out}(s)}{V_{in}(s)} = -\frac{R_4}{R_3} \times \frac{R_L C_2 s}{1 + (R_4 + R_L) C_2 s} \times \frac{R_1 C_2 s}{1 + \frac{R_1}{R_2} + R_1 C_2 s} \quad \text{(Equation 1)}$$

where $R_L$ is an input impedance of the analog circuit 400, assuming that the impedance may be purely resistive, connected to the output of the analog circuit 400. As such, one can see that when the input impedance $R_L$ is substantially large, then the transfer function G(s) as shown in Equation 1 may be simplified into Equation 2 as follows:

$$G(s) = \frac{V_{out}(s)}{V_{in}(s)} = -\frac{R_4}{R_3} \times \frac{\frac{R_1 R_2}{R_1 + R_2} C_1 s}{1 + \frac{R_1 R_2}{R_1 + R_2} C_1 s} \quad \text{(Equation 2)}$$

As such, one can see from Equation 2 that the transfer function G(s) of the analog circuit 400 may represent an analog derivative circuit with a low pass filter. The low pass filter may have typical values for the resistor and capacitor circuit elements, which are defined in the following table, Table 1, and may be associated with a low pass filter bandwidth of about 39 kHz.

TABLE 1

| Typical capacitance and resistance values | | | |
|---|---|---|---|
| $R_1$ | 680 Ω | $R_4$ | 18 kΩ |
| $R_2$ | 3.30 kΩ | $C_1$ | 47 nF |
| $R_3$ | 1.5 kΩ | $C_2$ | 10 nF |

An MBT detection algorithm is provided to implement the MBT detection method. The MBT detection algorithm may be divided into four steps. A first step related to the ionization signal conditioning will now be described. For each engine cylinder, the ionization signal and its analog derivative signal are sampled at every crank degree after the ignition coil dwell event for 120 degrees duration. As the ionization signal disappears after 120 crank angle degrees. Both sampled ionization signal and its derivative signal are conditioned by a low pass filtering to improve the quality of the sampled signal. In order to minimize a phase shift due to low pass filtering for the improved MBT timing estimation, a two-way low pass filtering technique may be used. The two-way low pass filter has the following transfer function.

$$F_B(z) \cdot F_F(z) = \frac{1-a}{1-az} \times \frac{1-a}{1-az^{-1}} \quad \text{(Equation 3)}$$

where a is the digital filter parameter associated with the low pass filter bandwidth, and FB(z) and FF(z) are first order backward and first order forward filter transfer functions, respectively. Further, the combined transfer function can be rewritten into Equation 3 as follows:

$$F_B(z) \cdot F_F(z) = \frac{(1-a)(1-a)}{(1-az)(1-az^{-1})} = \frac{(1-a)^2}{(1+a^2) - a(z + Z^{-1})} \quad \text{(Equation 4)}$$

Next, a step 2 related to an operational condition identification is introduced. That is in this step, an engine operational condition is identified, and a resulting output of this step is that a case determination for the sampled ionization signal is performed, i.e. Case 1, 2 or 3. Further, a step 3 related to the MBT timing criteria calculation is performed. As such, after the ionization signal case is identified, in step 2, The MBT timing criteria 50% MFB and MAMFB can be calculated using a peak location detection algorithm based upon the sample analog derivative of the ionization signal. That is, MAMFB and 50% MFB locations can be determined by locating minimal and maximum locations of the derivative signal, respectively. Note that in this case both inflection locations can be determined by minimum and maximum locations of the derivative signal, and therefore, the derivative calculation is eliminated. The peak cylinder location can be determined using a peak location detection algorithm based upon the filtered ionization signal.

Finally a step 4 related to the generation of the composite MBT timing criterion is introduced. The composite MBT timing criterion is calculated based upon the availability of the MBT timing criteria calculated from the in-cylinder ionization signal.

For Case 1, since all three MBT timing criteria are available, the composite MBT timing criterion can be calculated using the following equation $$CMBT = [\alpha_{PCPL}(PCPL - PCPL_{OFFSET}) + \alpha_{50\%MFB}(50\%MFB - 50\%MFB_{OFFSET}) + \alpha_{MAMFB}(MAMFB - MAMFB_{OFFSET})] / \beta \quad \text{(Equation 5)}$$

where $\beta = \alpha_{MAMFB} + \alpha_{50\%MFB} + \alpha_{PCPL} \neq 0$.

Since the composite MBT timing criterion may substantially be equal to zero when engine is running at its MBT timing condition, the MBT timing criteria MAMFB, 50% MFB and PCPL may need to be shifted from their nominal location defined by $MAMFB_{OFFSET}$, 50% $MFB_{OFFSET}$ and $PCPL_{OFFSET}$, respectively. $MAMFB_{OFFSET}$ is highly dependent of engine combustion system and is located a few crank degrees before or after TDC; and the 50% $MFB_{OFFSET}$ and $PCPL_{OFFSET}$ are around 8° to 10° and 14° to 16° ATDC, respectively when the engine is operated at its MBT timing. Since $MAMFB_{OFFSET}$, 50% $MFB_{OFFSET}$ and the $PCPL_{OFFSET}$ may vary as a function of engine operational conditions, one may propose to make them as a function of engine operational conditions such as engine speed, load, etc. Note coefficients $\alpha_{MAMFB}$, $\alpha_{50\%\ MFB}$, and $\alpha_{PCPL}$ may be either zero or one and are used to enable or disable the corresponding MBT timing criterion to be used for calculating the composite MBT timing criteria.

For Case 2, the sole MBT timing criteria available is the MAMFB. Therefore, the MAMFB criteria may be used for calculation of the composite MBT timing criterion using the following equation:

$$CMBT=MAMFB-MAMFB_{OFFSET} \quad \text{(Equation 6)}$$

As for Case 3, the MBT timing criteria available are the 50% MFB and PCPL, and thus the composite MBT timing criterion calculation utilizes both of them as follows:

$$CMBT = [\alpha_{50\%MFB}(50\%MFB - 50\%MFB_{OFFSET}) + \alpha_{PCPL}(PCPL - PCPL_{OFFSET})]/\gamma \quad \text{(Equation 7)}$$

$$\text{where } \gamma = \alpha_{50\%MFB} + \alpha_{PCPL} \neq 0.$$

Specific embodiments of a method for estimating MBT timing using in-cylinder ionization signal, and constructing a composite MBT timing criterion that is robust over engine operational map, have been described for the purpose of illustrating the manner in which the invention is used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of estimating minimum timing for a best torque timing, comprising the steps of:

determining an in-cylinder ionization signal;

calculating an analog derivative signal of the ionization signal; and determining a minimum timing for the best torque timing, wherein the minimum timing is determined based upon a shape of the ionization signal.

2. The method of claim 1, wherein the step of determining the minimum timing for the best torque timing further comprises the step of correlating the in-cylinder ionization signal to a cylinder pressure signal.

3. The method of claim 1, wherein the shape of the ionization signal includes at least one peak, a first peak represents a flame kernel growth and a second peak represents an re-ionization due to the in-cylinder temperature increase.

4. The method of claim 1, wherein the minimum timing is determined based on one or more of the following criteria:

a maximum flame acceleration location of mass fraction burned, a maximum heat release location and a second peak location.

5. The method of claim 4, wherein the maximum flame acceleration location correlates to Top Dead Center (TDC), the maximum heat release location correlates to a 50% mass fraction burn location and the second peak location correlates to a peak cylinder pressure location (PCPL).

6. The method of claim 1, wherein the ionization signal is sampled and conditioned by a low-pass filter.

7. The method of claim 6, wherein the conditioned ionization signal determines the peak cylinder pressure location (PCPL).

8. A method of estimating minimum timing for the best torque timing, comprising a step of combining minimum timing criteria to estimate the best torque timing criteria wherein the step of combining minimum timing criteria comprises combining criteria disclosed in an ionization signal, an analog derivative signal of the ionization signal and in a pressure signal wherein the minimum timing criteria are combined based on a shape of the ionization signal: and wherein the shape of the ionization signal includes at least one peak, a first peak represents a flame kernel growth and a second peak represents an re-ionization due to the in-cylinder temperature increase.

9. The method of claim 8, wherein the step of combining minimum timing criteria comprises combining criteria disclosed in an ionization signal and an analog derivative signal of the ionization signal.

10. The method of claim 8, wherein the step of combining minimum timing criteria comprises the step of combining a maximum flame acceleration location, a maximum heat release location, and the second peak location.

11. The method of claim 10, wherein the step of combining a maximum flame acceleration location, a maximum heat release location, and a second peak location comprises the steps of:

creating a first sum element by multiplying a PCPL coefficient by a subtraction of a PCPL offset location from the PCPL;

creating a second sum element by multiplying a 50% burn location coefficient by a subtraction of a 50% burn location offset location from the 50% burn location;

creating a third sum element by multiplying a maximum heat release location coefficient by a subtraction of a maximum heat release offset location from the maximum heat release location; and dividing a sum of all three sum elements by a sum of the three coefficients.

12. A method of estimating minimum timing for the best torque timing, comprising a step of combining minimum timing criteria to estimate the best torque timing criteria wherein the minimum timing criteria comprises a maximum flame acceleration location.

13. A method of estimating minimum timing for the best torque timing, comprising a step of combining minimum timing criteria to estimate the best torque timing criteria wherein the step of combining minimum timing criteria comprises the step of combining a maximum heat release location and a second peak location.

14. The method of claim 13, wherein the step of combining a maximum heat release location and a second peak location comprises the steps of:

creating a first sum element by multiplying a PCPL coefficient by a subtraction of a PCPL offset location from the PCPL;

creating a second sum element by multiplying a 50% burn location coefficient by a subtraction of a 50% burn location offset location from the 50% burn location; and dividing a sum of all two sum elements by a sum of the two coefficients.

15. A method of estimating minimum timing for the best torque timing, comprising a step of combining minimum timing criteria to estimate the best torque timing criteria wherein the step of combining minimum timing criteria comprises:

conditioning the ionization signal;

calculating minimum timing for the best torque timing based on a waveform of the ionization signal wherein the minimum timing is calculated based on the maximum flame acceleration location, the maximum heat release location, and the second peak location, if the waveform corresponds to a first waveform category;

and the minimum timing is calculated based on the maximum flame acceleration location, if the waveform corresponds to a second waveform category; and the minimum timing is calculated based on the maximum heat release location and the second peak location, if the waveform corresponds to a third waveform category.

16. A method of estimating minimum timing for the best torque timing, comprising a step of combining minimum timing criteria to estimate the best torque timing criteria wherein the step of combining minimum timing criteria comprises:

conditioning the ionization signal;

calculating minimum timing for the best torque timing based on a waveform of the ionization signal wherein the step of calculating minimum timing comprises combining at least two of the following criteria:

a maximum flame acceleration point, a maximum heat release location and a second peak location.

17. The method of estimating minimum timing for the best torque timing according to claim 16, wherein the step of combining at least two of a maximum flame acceleration location, a maximum heat release location, and a second peak location comprises the steps of:

creating a first sum element by multiplying a PCPL coefficient by a subtraction of a PCPL offset location from the PCPL;

creating a second sum element by multiplying a 50% burn location coefficient by a subtraction of a 50% burn location offset location from the 50% burn location;

creating a third sum element by multiplying a maximum heat release location coefficient by a subtraction of a maximum heat release location offset location from the maximum heat release location; and dividing a sum of the three sum elements by a sum of the three coefficients.

18. An minimum timing for the best torque estimator, comprising:

a controller;

memory operably connected to the controller;

software stored in the memory;

an ionization detection unit operably connected to the controller, wherein the controller is adapted to determine minimum timing for the best torque timing criteria; and wherein the software comprises instructions which calculate the minimum timing based on one or more of the following criteria;

a maximum flame acceleration location, a maximum heat release location and a second peak location.

19. The minimum timing for the best torque estimator according to claim 18, further comprising a lookup table operably connected to the controller, wherein timing criteria is stored in the lookup table.

20. The minimum timing for the best torque estimator according to claim 18, wherein the software comprises instructions that correlate a spark plug ionization signal and a derivative analog signal of the ionization signal to a cylinder pressure signal.

21. The minimum timing for the best torque estimator according to claim 18, wherein the software comprises:

instructions to categorize an ionization signal waveform; and instructions to calculate minimum timing for the best torque timing.

22. The minimum timing for the best torque estimator according to claim 21, wherein the minimum timing is calculated based on the maximum flame acceleration location, the maximum heat release location, and the second peak location, if the waveform corresponds to a first waveform category;

and the minimum timing is calculated based on the maximum flame acceleration location, if the waveform corresponds to a second waveform category; and the minimum timing is calculated based on the maximum heat release location and the second peak location, if the waveform corresponds to a third waveform category.

* * * * *